United States Patent [19]
Murray et al.

[11] Patent Number: 5,844,629
[45] Date of Patent: Dec. 1, 1998

[54] DIGITAL-TO-ANALOG VIDEO ENCODER WITH NOVEL EQUALIZATION

[75] Inventors: Brian P. Murray, Dublin; Philip A. Curran, County Dublin, both of Ireland; Colm J. Prendergast, Cambridge, Mass.; Timothy J. Cummins, County Clare, Ireland

[73] Assignee: Analog Devices, Inc., Norwood, Mass.

[21] Appl. No.: 655,624

[22] Filed: May 30, 1996

[51] Int. Cl.⁶ ..................................................... H04N 9/64
[52] U.S. Cl. .................. 348/642; 348/660; 348/663; 348/450; 348/712; 348/713; 348/708
[58] Field of Search .................... 348/450, 571, 348/608, 612, 638, 639, 642, 659, 660, 663, 664, 665, 708, 712, 713, 724, 914; 345/153, 154; H04N 9/67, 9/78, 11/20, 9/64

[56] References Cited

U.S. PATENT DOCUMENTS

| | | | |
|---|---|---|---|
| 4,419,686 | 12/1983 | Morrison | 358/13 |
| 4,472,733 | 9/1984 | Bolger | 348/666 |
| 4,531,149 | 7/1985 | Lewis, Jr. | 348/520 |
| 4,908,697 | 3/1990 | Tsinberg et al. | 358/12 |
| 4,949,166 | 8/1990 | Isnardi | 348/665 |
| 5,124,787 | 6/1992 | Lee et al. | 348/612 |
| 5,175,619 | 12/1992 | Willis | 348/452 |
| 5,257,103 | 10/1993 | Vogeley et al. | 358/140 |
| 5,287,171 | 2/1994 | Ohtsubo et al. | 348/500 |

Primary Examiner—Sherrie Hsia
Attorney, Agent, or Firm—Fish & Richardson P.C.

[57] ABSTRACT

A digital-to-analog video encoder method and apparatus having unique equalization are disclosed. The encoder converts digital video signals into one or more analog video formats using one or more digital-to-analog converters. Equalization is provided to compensate for zero order hold effects of the digital-to-analog converters. Equalization is provided to a luminance signal and/or a chroma signal to equalize RGB, composite video, and super VHS video outputs. Multiplexed digital-to-analog converter inputs allow selection of several output formats.

15 Claims, 3 Drawing Sheets

DIGITAL-TO-ANALOG VIDEO ENCODER WITH NOVEL EQUALIZATION

BACKGROUND OF THE INVENTION

The present invention relates generally to the field of video encoders.

Video signals are frequently transmitted or stored in digital form. Examples include satellite transmission of TV programs and computer disk storage of TV clips or multimedia presentations. One digital video format in widespread use is the CCIR-601 digital component video standard commonly referred to as 4:2:2 video. Video encoders are used to convert this and other digital formats into one or more of the analog video formats used in televisions, monitors, VCRs, and other personal and professional video products. Typical video encoders introduce distortion into the video signals due to the zero order hold effects of the digital-to-analog converters ("DACs") used. Some high-end studio-quality video encoders compensate for the distortion by providing an equalization filter at the input of each DAC. Typically, three filters are required significantly raising the complexity and cost of the encoder.

SUMMARY OF THE INVENTION

A video encoder in accordance with one aspect of the present invention includes a digital video input, a modulator having a color difference input and a chroma signal output, and a digital-to-analog converter. The encoder includes an equalization filter having an input connected to the chroma signal output of the modulator and an equalized chroma output. The encoder further includes a composite video generator having chroma and luminance inputs and a composite video output, the chroma input is connected to receive the equalized chroma signal from the filter and the output is connected to the digital-to-analog converter.

A digital-to-analog video encoder in accordance with another aspect of the present invention includes a digital video input, including a luminance and two color difference components. A luminance equalization filter is connected to receive the luminance component and provides an equalized luminance output. A modulator connected to receive the color difference components has a chroma output connected to an equalization filter. A composite video generator has an equalized chroma input connected to the equalization filter, an equalized luminance input connected to the luminance filter, and a composite video output connected to a multiplexer input for providing an equalized composite video output. A component analog video generator has inputs connected to receive the equalized luminance output and the color difference components and has outputs connected to the multiplexer inputs for providing a component analog video output. The multiplexers have outputs connected to digital-to-analog converters and have inputs connected to the equalized luminance output and to the equalization filter. The encoder selects one or more video formats to convert to analog signals.

A video encoder in accordance with another aspect of the present invention includes an input for receiving digital video signals, a luminance filter connected to the input for receiving a luminance input signal and having a filter output for providing an equalized luminance signal. A video converter having an input connected to the filter output for receiving the equalized luminance signal selectively converts the digital video signals and the equalized luminance signal to a standard format video signal and outputs digitized video signals representative of the standard format video signal. A digital-to-analog converter having an input connected to receive the digitized video signals and having an output selectively converts the digitized video signals to analog signals according to a predetermined transfer function providing the standard format video signal on the output. The luminance input filter has an equalization response bearing a predetermined relationship to at least one characteristic of the transfer function.

A video encoding method in accordance with another aspect of the present invention includes the steps of combining color difference signals to form a chroma signal, equalizing the chroma signal to form an equalized chroma signal, combining the equalized chroma signal with a luminance signal to form an equalized composite video signal, and converting the equalized composite video signal to an analog output signal.

A video encoding method in accordance with another aspect of the present invention includes the steps of filtering color difference and luminance input signals, the step of filtering the luminance input signal also providing equalization, combining the filtered color difference signals to form a chroma signal, equalizing the chroma signal to form a equalized chroma signal, combining the equalized chroma signal with the filtered and equalized luminance signal to form an equalized composite video signal, and converting the equalized composite video signal to an analog output signal.

A video encoding method in accordance with another aspect of the present invention includes the steps of receiving a digital video signal, separating the digital video signal into a luminance and color difference components, filtering the luminance component, and generating a digitized component analog video signal using said equalized luminance component.

The above method may further include the steps of generating a chroma signal using said color difference components, filtering said chroma signal to norm an equalized chroma signal, and selectively generating analog video signals responsive to the digitized component analog video signal or the equalized chroma signal.

DESCRIPTION OF THE PREFERRED EMBODIMENTS

Figure 2:
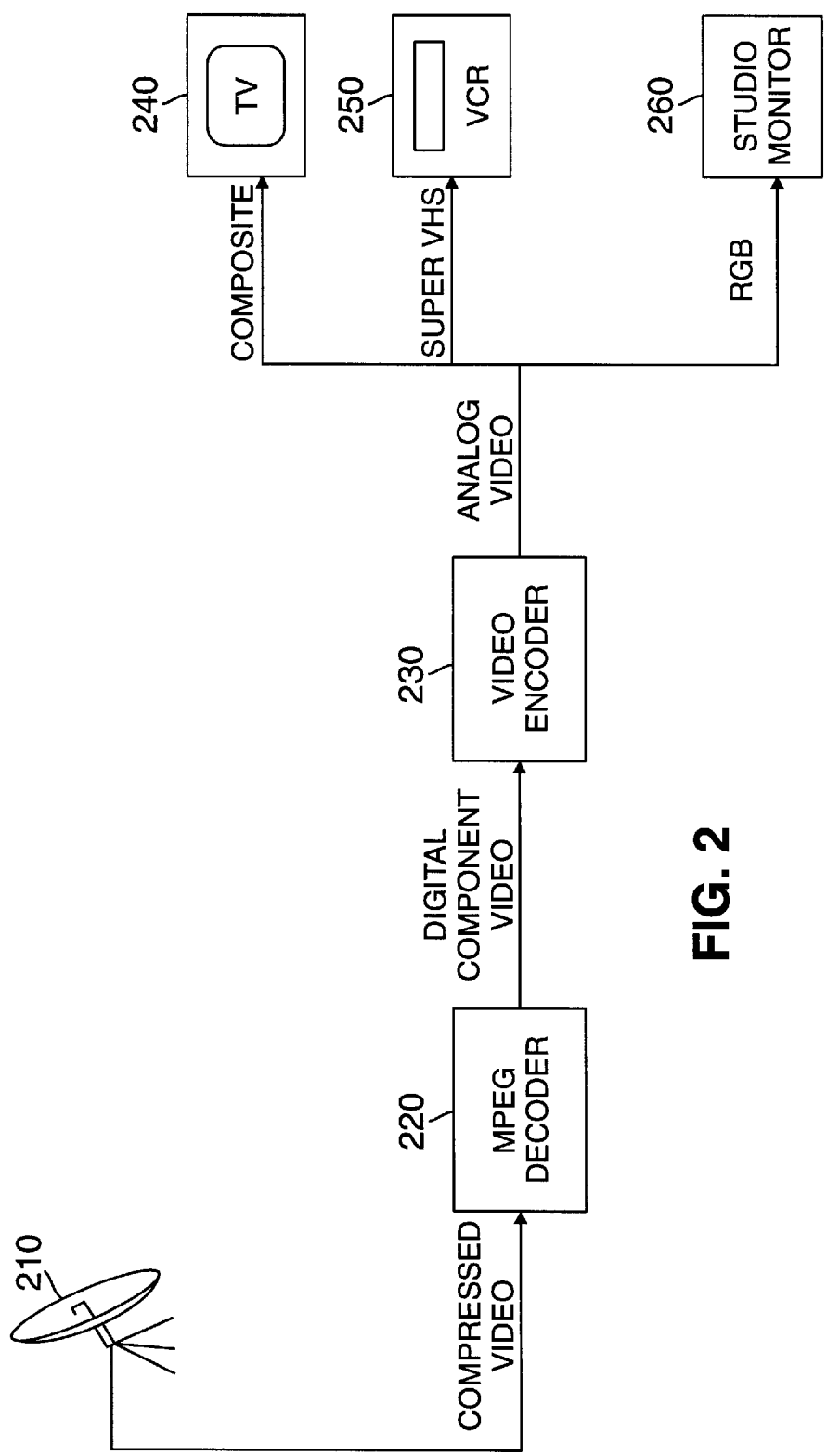
FIG. 2 is a block diagram of an encoder in a satellite receiver application.

A typical satellite television receiver system is shown in the block diagram of FIG. 2. Compressed video signals are provided by satellite receiver 210 and decoded into digital component video by MPEG decoder 220. The video encoder 230 converts the digital video into analog video signals that can be used by standard video components such as television 240, VCR 250, and studio monitor 260. Any of three different analog video signal formats may be desired or required depending upon the particular video component. For example, a composite video signal is required by many TVs and VCRs. Many higher fidelity TV and VCR components also accept super VHS signals. Still higher fidelity components such as those used for studio applications require RGB or Y/PR/PB analog video signals.

Figure 3:
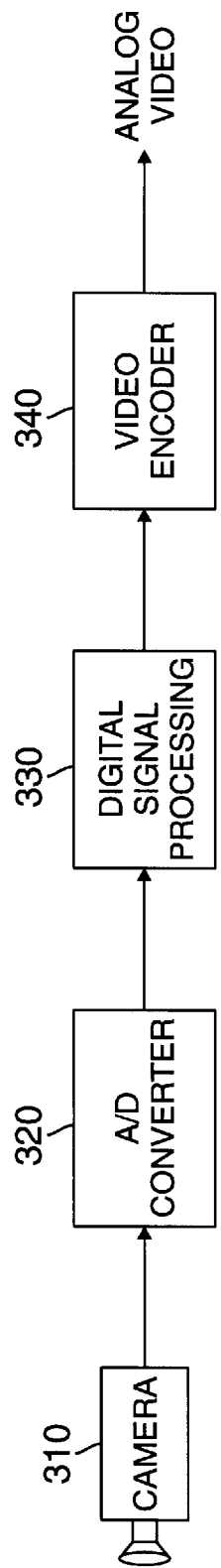
FIG. 3 is a block diagram of an encoder in a camera application.

Digital-to-analog video encoders are also useful in camera applications such as camcorders and broadcast cameras. Referring to FIG. 3, analog signals from camera sensor 310 are converted to digital values by analog-to-digital converter ("A/D") 320 and fed to digital signal processor 330 which performs the necessary signal processing such as picture enhancement, special effects, digital zoom, etc. The digital video is then converted to analog video for use by other components such as a video tape recorder or video monitor by video encoder 340.

A video encoder 1 in accordance with one aspect of the present invention suitable for use as encoder 230 in FIG. 2 and encoder 340 in FIG. 3 will now be described with reference to FIG. 1. A digital component video input is converted to three analog formats, composite video, super VHS, and component analog video ("CAV") by digital-to-analog video encoder 1. The 4:2:2 digital component video input includes a luminance signal Y and two scaled color difference signals CR and CB which are scaled replicas of the common U and V color difference signals. The composite video output CV is a single analog signal which is a composite of all three Y, U, V input signals. The super VHS output comprises two analog signals, a luminance signal Y which is an analog version of the digital luminance input and a chroma signal C. The chroma signal is a composite of the color difference signals U and V. The CAV output comprises three analog signals R, G, and B or alternatively Y, PR, and PB which are derived from the Y, U, and V inputs. The encoder 1 includes three DACs 110, 120, and 130 to convert digital signals to analog outputs (shown in DAC section 400C). The DAC inputs are respectively connected to multiplexers 80, 90, 100 so that either the CAV (RGB or Y/PR/PB) or the composite video and super VHS signals may be provided on the encoder outputs 115, 125, and 135.

The 4:2:2 digital video is received in a stream of digital samples at a 27 MHz data rate which is the sum of the respective sample rates of the Y (13.5 MHz), CR (6.75 MHz), and CB (6.75 MHz) signals. The incoming data stream is first separated into the respective $Y_{in}$, CR, and CB components by parser 5 which then routes the samples to the appropriate filter inputs.

Each of the $Y_{in}$, CR, and CB input samples is band limited and scaled by a respective input filter 10, 20, and 30 (shown in Filter section 400A). Filters 10, 20, and 30 may be used to scale the $Y_{in}$, CR, CB input signals to the Y, U, V levels using the following scale factors.

$Y=1.164(Y_{in}-16)$ $U=0.991(CB-128)$ $V=1.399(CR-128)$

The luminance and color difference signals may be band limited by filters 10, 20, and 30 to their respective 5.5 MHz and 1.3 MHz bandwidths with a low pass finite impulse response ("FIR") filter. Input filters 10, 20, and 30 may also be used to interpolate the Y, U, and V signals. A novel filter, described in a copending application Ser. No. 08/655,769, U.S. Pat. No. 5,784,378, entitled "Method and Apparatus for Time Shared Finite Impulse Response Filter with Multiple Signal Stream Capability" filed concurrently herewith (Express Mail No. EH329458714US, deposited on May 30, 1996) the contents of which are incorporated here by reference, may be used. Using a 27 MHz sampling rate for DACs 110, 120, and 130, the Y input preferably is interpolated by a factor of 2 and the color difference signals are preferably interpolated by a factor of 4.

Component Analog Video Encoder

The scaled, filtered, and interpolated Y, U, V signals are fed to a matrix converter 60 on input lines 61, 62, and 63. Matrix converter 60 solves three simultaneous equations for each set of Y, U, and V samples fed to inputs 61, 62, and 63:

$Y=0.299R+0.587G+0.114B$ $U=0.492(B-Y)$ $V=0.877(R-Y)$ yielding the R, G, and B values. The results are provided by matrix converter 60 as digital R, G, and B signals on the outputs which are fed to the B inputs 102, 92, and 82 of multiplexers 100, 90, and 80, respectively. When the B inputs of multiplexers 80, 90, 100 are selected, the digital R, G, and B signals are respectively input to DACs 130, 120 and 110 which convert the digital signals into the analog R, G, and B video signals. The analog R, G, B signals are provided on output terminals 135, 125, and 115, respectively.

Preferably, matrix converter 60 is provided with a format selector input 64 which may be used to control the CAV output format and the respective conversion algorithm. For example, the matrix converter 60 may be switched between the RGB and the Y/PR/PB formats using a single format selector line 64. Although several slightly different Y/PR/PB formats exist, the following set of scaling factors is one example being used in studio equipment.

Y=Y

PR=0.813 V

PB=1.146 U

When selected via selector input 64, the Y, PR, and PB signals are output by matrix converter 60 as digital signals which are fed to the B inputs 92, 102, and 82 of multiplexers 90, 100, and 80 (shown in multiplexer section 400B), respectively. When the B inputs of multiplexers 80, 90, 100 are selected, the digital Y, PR, PB signals are respectively input to DACs 120, 130, and 110 which convert the digital signals into the analog Y, PR, PB video signals. The analog Y, PR, PB signals are provided on output terminals 125, 135, and 115 respectively.

Composite Video Encoder

The filtered color difference signals U, V are also fed to modulator 40 on inputs 41 and 42, respectively. Modulator 40 performs a quadrature modulation of the U and V signals onto a standard color sub-carrier to form the chroma signal C. The composite video signal is formed by summing the chroma C signal and the luminance signal Y. Adder 70 receives the Y and C signals on inputs 71 and 72, respectively, and provides digitized composite video values to the A input 81 of multiplexer 80. When the A inputs of the multiplexers are selected, DAC 110 converts the digital composite video values to an analog composite video signal CV which is provided on output 115.

Super VHS Encoder

Similarly, the super VHS output Y, C is provided on outputs 125 and 135 when the A inputs of the multiplexers are selected. The digital chroma signal C is received by DAC 130 through the A input 101 of multiplexer 100 and the digital luminance Y signal is received by DAC 120 through the A input 91 of multiplexer 90. The digital C and Y signals are converted by DACs 120 and 130 into the analog Y and C signals and provided on outputs 125 and 135 when the A inputs are selected. It will be appreciated that each analog signal is obtained by digital-to-analog conversion by one of DACs 110, 120, and 130.

Equalization

Each DAC 110, 120, and 130 presents a zero order hold to its respective signal which means that each sample is held constant at the DAC output until the next sample is output. The zero order hold creates a lowpass filter having a transfer function commonly referred to as Sin x/x. The Sin x/x transfer function presents an attenuation at the band edge, i.e. higher frequencies than at lower frequencies, i.e. DC. In video applications, this error is significant because the bandwidth of a video signal is approximately 5.5 MHz. At 5.5 MHz, the attenuation due to the zero order hold of a DAC operating at a sampling frequency of 13.5 MHz is approximately 2.5 dB. This attenuation, if uncompensated, would result in distortion.

The color burst signal having a 2.6 MHz bandwidth is centered at 3.58 MHz for NTSC video and 4.43 MHz for PAL video. The attenuation of those signals using a 13.5 MHz DAC sample frequency is 1.0 dB and 1.6 dB, respectively. That level of attenuation of the color burst signal is significant because it should have the same amplitude as the sync pulse which is at DC. The zero order hold would thus cause a 1.0 or 1.6 dB error in the relative amplitudes of the sync and color burst signals at 13.5 MHz sampling rates. The attenuation may be lessened by increasing the DAC sampling frequency. At a sampling frequency of 27 MHz, the attenuation at 5.5 MHz, 3.58 MHz, and 4.43 MHz decreases to 0.6 dB, 0.25 dB and 0.4 dB, respectively. Although reduced, the attenuation still causes distortion. Still higher sampling frequencies may be used but the cost of the DACs increases dramatically.

In order to correct for effects of the zero order hold, equalization filters may be provided before the input of each DAC to amplify the signals which will be attenuated. Such Sin x/x equalization filters provide a response complimentary to the Sin x/x response of the DAC amplifying by an amount equal to the attenuation those signals that would otherwise be attenuated by the DAC. Using equalization filters a reasonably flat response can be attained. The filters are expensive, however, so it is desirable to minimize the number required.

Figure 1:
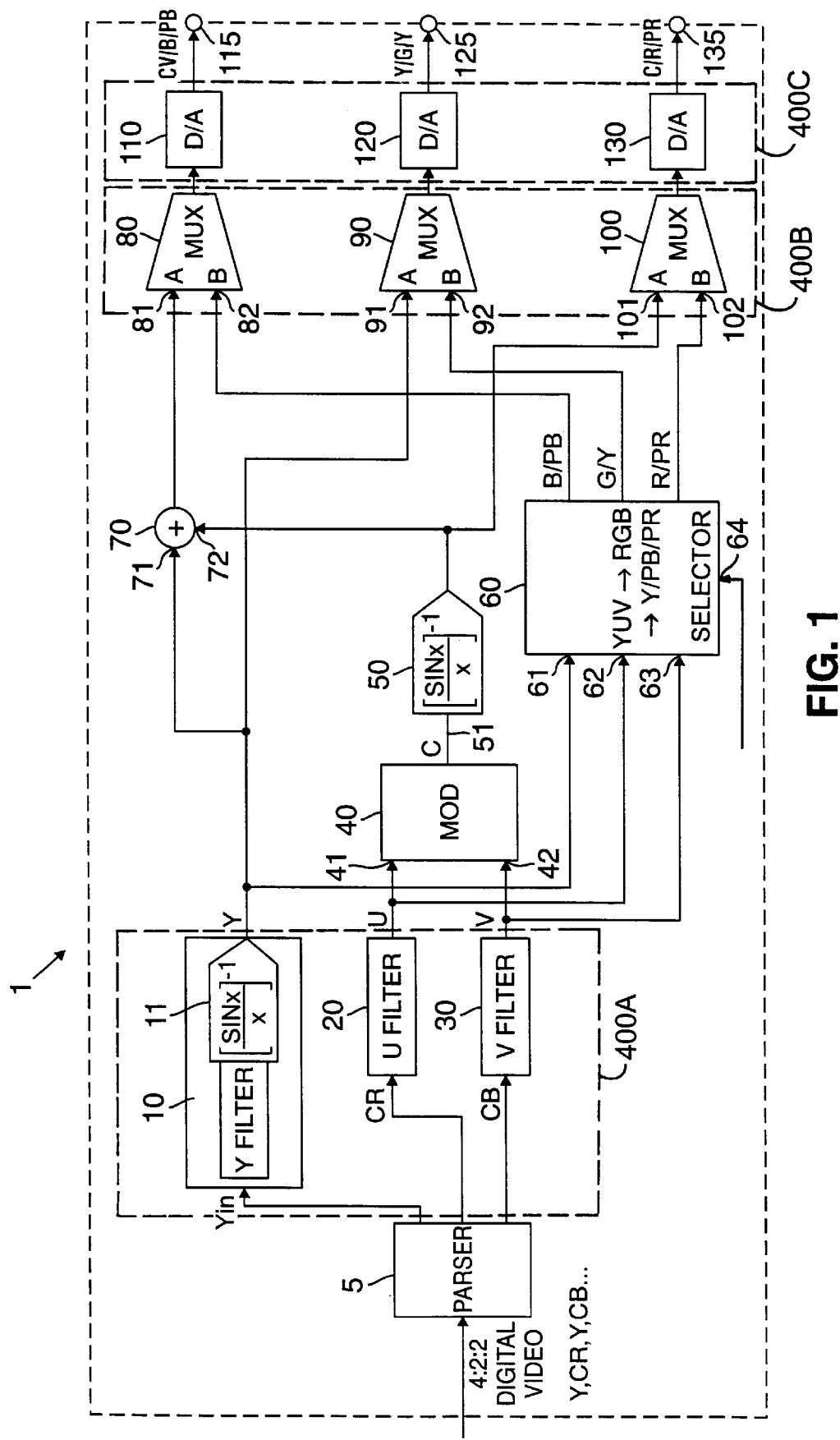
FIG. 1 is a functional schematic block diagram of a digital-to-analog video encoder.

The encoder 1 of FIG. 1 presents an equalized encoder solution which minimizes the number and cost of equalization filters without sacrificing signal quality. Recognizing that the conversion from digital component video to analog component video (RGB and Y/PR/PB) is linear and that the luminance input signal carries most of the higher frequency information, the present invention allows for a reduction in the number of equalization filters required for producing high quality analog component video. As discussed above, the luminance component, having a 5.5 MHz bandwidth, will be significantly attenuated by the zero order hold of the DACs. The color difference signals having only a 1.3 MHz bandwidth will not be attenuated appreciably. The attenuation at 1.3 MHz for DACs operated at 27 MHz is only 0.03 dB which is below the specified 0.035 dB noise floor for 8 bit RGB signals. In accordance with one aspect of the present invention, only the luminance component of the input is equalized prior to matrix conversion to component analog video (RGB or Y/PR/PB) for equalization of the zero order hold of the DACS.

Referring to FIG. 1, the luminance component is equalized by the Y input filter 10. The equalization portion is functionally represented by equalizer 11 in FIG. 1, however, a separate circuit is not required. The equalization response may be added to filter 10 with no added cost by appropriately changing the coefficients of the filter. In encoder 1, each of the three analog R, G, and B output signals is equalized by modification of filter 10. Cost and hardware savings over alternative equalization schemes are thus achieved by eliminating the equalization filters at the inputs to the DACs and still fully compensating each of the three R, G, and B and Y, PR, and PB signals.

Super-VHS video includes a luminance and a chroma signal. As discussed above, attenuation of the chroma signal which is centered at the color burst frequency is particularly objectionable and should be equalized. The luminance signal should also be equalized having a bandwidth extending to 5.5 MHz. The encoder of FIG. 1 provides for equalization of both of the luminance and chroma signals. The luminance signal may be equalized by Y input filter 10 at no added cost as discussed above in connection with the RGB and Y/PR/PB encoder. An equalization filter 50 may be added to the output of modulator 40 to equalize the digitized chroma signal C as shown in FIG. 1.

Composite video may be equalized in either of two ways. An equalization filter connected between the composite video generator output and the digital-to-analog converter input may provide the equalization. Alternatively, the luminance and chroma signals may be equalized separately as shown in FIG. 1. The scheme shown in FIG. 1 is preferred because it enables encoding of several formats (RGB, Y/PR/PB, composite video, and super VHS) using the same equalizers. It will be appreciated that only the chroma equalizer 50 requires any additional circuitry.

From the foregoing description it will be apparent that improvements in video encoder systems and methods have been provided to reduce the complexity and cost of the equalization filters. While preferred embodiments have been described, it will be appreciated that variations and modifications of the herein described systems and methods, within the scope of the invention will be apparent to those of skill in the art. Accordingly, the foregoing description should be taken as illustrative and not in a limiting sense.

What is claimed is:

1. A video encoder comprising:

a digital video input for receiving a digital video signal;

a modulator having a color difference input connected to said digital video input and having a chroma signal output for providing a chroma signal;

a chroma equalization circuit having an input connected to said chroma signal output for receiving said chroma signal and having an equalized chroma output for providing an equalized chroma signal;

at least one digital-to-analog converter having a digital input connected to said equalized chroma output for receiving said equalized chroma signal and an analog output for providing an analog video output signal;

said equalization circuit having a response bearing a predetermined relationship to at least one characteristic of a transfer response of said digital-to-analog converter.

2. The video encoder of claim 1 further comprising:

an luminance input filter having an input connected to said digital video input for receiving a luminance signal, said luminance input filter having a response bearing a predetermined relationship to said at least one characteristic of said transfer response of said digital-to-analog converter; and wherein said analog video output signal comprises an equalized luminance component.

3. The video encoder of claim 2 further comprising:

a matrix converter having an input connected to an output of said luminance input filter for receiving a compensated digital luminance signal and an input connected to said digital video input for receiving said color difference signal;

said matrix converter selectively generating equalized digitized component analog video signals on an output connected to said at least one digital-to-analog converter; and said analog output further comprising an equalized component analog video signal.

4. The video encoder of claim 3 wherein:

said matrix converter further comprises a format selector; and said matrix converter selectively generates and outputs equalized digital RGB or equalized digital Y/PR/PB signals as said equalized component analog video signals in response to said format selector; and said equalized component analog video signal selectively comprises equalized RGB or equalized Y/PR/PB video signals.

5. A video encoder comprising:

an input for receiving digital video signals;

a luminance filter connected to said input for receiving a luminance input signal and having a filter output for providing an equalized luminance signal;

a video converter having an input connected to said filter output for receiving said equalized luminance signal, said video converter selectively generating and outputting digitized video signals representative of a standard format video signal responsive to said digital video signals and said equalized luminance signal;

a digital-to-analog converter having an input connected to receive said digitized video signals and an output, said digital-to-analog converter selectively converting said digitized video signals to analog signals according to a predetermined transfer function and providing said standard format video signal on said output; and said luminance input filter having an equalization response bearing a predetermined relationship to at least one characteristic of said transfer function.

6. The video encoder of claim 5 wherein:

said video converter further comprises a matrix converter and an input connected to said input to receive color difference signals;

said digitized video signals comprise at least one set of either R, G, and B or Y, PR, and PB signals; and said matrix converter generates said digitized video signals responsive to said equalized luminance signal and said color difference signals.

7. The video encoder of claim 6 further comprising:

a modulator having an input connected to said input for receiving said color difference signals and an output for providing a digitized chroma signal, said modulator selectively generates and outputs said digitized chroma signal responsive to said color difference signals according to a predetermined modulation scheme;

an equalization circuit having an input connected to said output of said modulator for receiving said digitized chroma signal, having an equalization response bearing a predetermined relationship to at least one characteristic of said transfer function, and having an equalizer output, said equalization circuit outputs an equalized chroma signal to said equalizer output;

a composite video generator having inputs connected to said equalizer output and to said filter output to receive said equalized luminance signal and said equalized chroma signal and having an output for providing a digitized composite video signal, said composite video generator generates and outputs said digitized composite video signal in response to said equalized luminance signal and said equalized chroma signal in accordance with a predetermined algorithm; and a two-to-one multiplexer having a first input connected to receive said digitized composite video signal and said equalized luminance signal and said equalized chroma signal and a second input connected to receive said digitized video signals and an output connected to said input of said digital-to-analog converter;

said multiplexer selects either said digitized composite video signal and said equalized luminance signal and said equalized chroma signal on the one hand or said digitized video signals on the other hand for conversion and output by said digital-to-analog converter.

8. The video encoder of claim 7 further comprising:

a selector input connected to said video converter for receiving a format signal;

said video converter selectively outputs said R, G, and B signals in response to a first format signal and selectively outputs said Y, PR, and PB signals in response to a second format signal.

9. A video system comprising:

a video input for receiving a video signal;

a decoder connected to receive said video signal and responsively generating digital component video signals on a decoder output;

a parser connected to said decoder output for receiving said digital video signals and responsively routing luminance and color difference signals to an input filter;

said input filter having an equalization response for compensating said luminance signal;

a format converter having an input connected to said filter for receiving a compensated luminance signal and said color difference signals and an output connected to a digital-to-analog converter, said format converter selectively generates a compensated digital video signal;

said digital-to-analog converter selectively generates and outputs at least one analog video signal responsive to said compensated digital video signal;

at least one video device connected to receive said at least one analog video signal.

10. The video system of claim 9 wherein:

said format converter further comprises a matrix converter;

said compensated digital video signal comprises a digitized component analog video signal;

said format converter selectively generates said digitized component analog video signal responsive to said compensated luminance and said color difference signals.

11. The video system of claim 9 wherein:

said format converter further comprises a chroma modulator having an output connected to a chroma equalizer for generating a compensated chroma signal;

said compensated digital video signal comprises at least one of a composite video and a super VHS formatted digital video signal;

said format converter selectively generates said composite digital video signal responsive to said compensated luminance and said compensated chroma signals.

12. The video system of claim 9 further comprising:

a carrier input connected to a demodulator; and said demodulator having an output connected to said video input, said demodulator selectively generates said video signal responsive to said carrier input.

13. A method of encoding video signals comprising the steps of:

receiving a digital video signal;

separating said digital video signal into a luminance component and a color difference component;

filtering said luminance component to form a frequency response equalized luminance component;

generating a digitized component analog video signal using said equalized luminance component.

14. The method of claim 13 further comprising the steps of:

generating a chroma signal responsive to said color difference component;

filtering said chroma signal to form an equalized chroma signal;

selectively generating analog video signals responsive to said digitized component analog video signal or said equalized chroma signal.

15. The method of claim 13 further comprising the steps of:

selecting a conversion format; and outputing said digitized component analog video using said selected conversion format.

* * * * *